April 23, 1946.  E. H. AYERS  2,398,993
PROTECTIVE SYSTEM
Filed Oct. 15, 1943
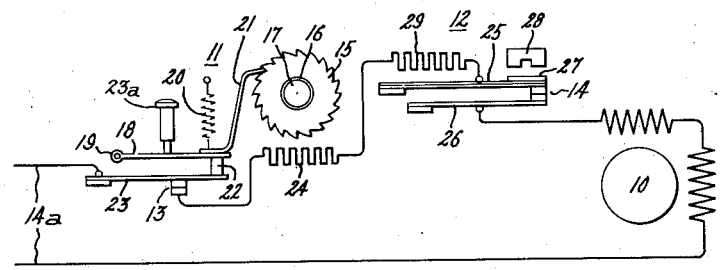
Inventor:
Edgar H. Ayers,
by Harry E. Dunham
His Attorney.

Patented Apr. 23, 1946

2,398,993

UNITED STATES PATENT OFFICE 2,398,993

PROTECTIVE SYSTEM

Edgar H. Ayers, Schenectady, N. Y., assignor to General Electric Company, a corporation of New York Application October 15, 1943, Serial No. 506,369

10 Claims. (Cl. 175—294)

My invention relates to electric protective systems and apparatus, more particularly to systems and apparatus for deenergizing a motor in the event of an excessive current in the motor, and has for its object means for protecting an electric motor from overheating during overload including stalled rotor conditions while providing for periodic energization and deenergization of the motor under such overload conditions until the temperature of the motor rises to a limiting value.

My motor control system is particularly applicable to electric motors of the alternating current split phase or repulsion induction type such as used in the operation of various apparatus, such as coal stokers, which often jams and prevents starting of the motor. For example, in a coal stoker iron particles or large lumps of coal may jam the feed mechanism and overload the motor or prevent the motor from starting when the motor is first energized. However, if the motor is energized and deenergized a plurality of times, the lumps of coal or other particles jamming the feed may be broken and the operation of the stoker continued. My control system is also applicable to such direct current motors as can withstand the stalled rotor condition.

It is an object of my invention to provide means for protecting the motor against damage from overload currents and also automatically to energize and deenergize the motor several times under stalled rotor conditions, after which the motor is permanently disconnected from the supply source.

In carrying out my invention in one form I provide two overload protective devices, each of which operates an electric switch in the circuit of the motor. One of these devices operates in response to motor current to open the motor circuit and thus protect the motor under all overload conditions including stalled rotor conditions. The other of these devices operates also in response to motor current but under stalled rotor conditions opens the motor circuit much more quickly than the first device. The second device, after opening the circuit, recloses it after a predetermined time interval and may repeat the opening and closing cycle several times until the first device is heated sufficiently to operate and permanently open the motor circuit.

For a more complete understanding of my invention reference should be had to the accompanying drawing, the single figure of which is a diagrammatic representation of a motor protective system embodying my invention.

I have shown my invention in one form as applied to the protection of an alternating current motor 10 of the alternating current split phase type. In accordance with my invention I provide two current responsive protective devices 11 and 12, both of the thermal current responsive type. These devices operate respectively normally closed electric switch means shown as two switches 13 and 14 connected in series with each other in the supply connections connecting the motor to a suitable alternating current electric supply source 14a.

The temperature responsive device 11 is shown as of a so-called "solder pot" type. It comprises a ratchet wheel 15 which is normally held by a layer of a suitable solder 16 to a stationary central pin 17 whereby the ratchet is held against rotation. The ratchet wheel holds an arm 18 pivoted at 19 in the position shown against the tension of a spring 20, a spring strip 21 on the end of the arm 18 engaging an adjacent tooth of the ratchet wheel thereby to hold the arm 18 in the position shown. An electrically insulating projection 22 on the arm 18 bears against a spring arm 23 carrying one of the contacts of the switch 13 thereby holding the contact carried by the arm 23 in engagement with the other stationary contact.

Included in the motor circuit is a heating resistance 24 which is closely associated with the ratchet wheel 15 and the solder film 16 so as to heat the solder in response to the current in a motor circuit. A solder pot current responsive device of this type is disclosed, for example, in U. S. Patent 2,006,966 to Richard H. Schmitt, issued July 2, 1935. When the solder 16 melts in response to the heating effect of the resistor 24, the ratchet wheel is free to turn clockwise, as seen in the drawing, by the force applied by the spring 20 whereby the projection 22 is moved upward to release the contact arm 23. This spring contact arm 23 then moves upward at its right-hand end in response to its spring bias and separates the contacts 13, thereby opening the circuit of the motor. After the solder has cooled and solidified to hold the ratchet wheel 15 the arm 18 may be relatched on the ratchet wheel and the switch 13 reclosed by pressing on a suitable button 23a.

The overload current responsive device 11 is constructed with such current responsive characteristics that the solder 16 is melted and the motor circuit opened under all overload current conditions before overheating and damage to the motor. It operates to open the motor circuit in a period of time which is substantially inversely proportional to square of the current in the motor circuit under overload current conditions. It will be understood, of course, that the solder is not heated to a melting temperature by the motor current under normal continuous running load conditions.

The other current responsive device 12 is shown as of a bimetallic strip thermostat type. It comprises a bimetallic strip 25 which is secured to a suitable support at its left-hand end and on its right-hand end carries a movable contact normally in engagement with a stationary contact of the switch 14. The lower stationary contact is mounted on the end of a spring arm 26 which biases the stationary contact upward somewhat against the movable contact carried by the bimetallic strip. On the end of the thermostat is a magnetic iron armature 27 which is attracted by a stationary permanent magnet 28 to give a snap action in the movements of the end of the thermostat, and hence snap opening and closing of the contacts. A heater 29 for the bimetallic strip is connected in the circuit of the motor. This device 12 may be constructed as described and claimed in U. S. Patent 2,213,890 to Edward J. Schaefer, issued September 3, 1940.

The current responsive device 12 is constructed and arranged to give over protection for the motor under stalled rotor conditions. In other words, the heater 29 heats the bimetallic strip to a temperature sufficient to open the switch 14 and deenergize the motor in a relatively short time interval and before the motor is heated to its maximum safe temperature. It will be understood that the thermostat when heated flexes so as to move its free end upward toward the magnet 28, and after a slight amount of movement the attraction of the magnet for the armature is sufficient to pull the armature to its fully attracted position against the magnet whereby the switch 14 is opened with a snap action. The thermostat now cools since its heater 29 is deenergized, whereby its free end tends to move downward and finally pulls the armature away from the magnet with a snap action to reclose the switch 14 and re-energize the motor.

I contemplate that the device 12 may open and reclose the motor circuit several times before the motor is heated to its maximum safe temperature and is permanently deenergized by the device 11. It should be noted that periodic opening and closing of the circuit of the motor decreases the rate of heating of the device 11 and consequently, as a result of this operation of the device 12, the device 11 requires a longer time to be operated, assuming that the motor does not break free the condition stalling it.

In a typical protective equipment for a repulsion motor having a 4-ampere continuous current rating, I provided a bimetallic relay 12 having a continuous current rating of 8 amperes and a solder pot relay 11 having a continuous current rating of 4.2 amperes. These relay current ratings are the currents which, if continued for a long period of time, will eventually heat the relays hot enough to cause them to open their switches. This period of time for operation at the rated current is about 90 minutes. The motor was energized under stalled rotor conditions, i. e., with its rotor locked against rotation, its stalled current being approximately 12.5 amperes. The automatic reclosing relay 12 opened in approximately 20 seconds. After a time interval of about 105 seconds, the bimetallic thermostat cooled sufficiently to reclose the motor circuit and then, after somewhat less than 20 seconds, it was heated again to its operating temperature and reopened the motor circuit. It operated through approximately four of these opening and closing cycles until, after an interval of approximately 500 seconds from the initial closing of the motor circuit, the relay 11 operated permanently to deenergize the motor.

It will be observed that under these stalled rotor current conditions the device 12 was closed about 16 per cent of the time. Of course, when the device 12 is closed, it is heated by the full stalled current of approximately 12½ amperes, and consequently is actually responsive to this current. On the other hand, the device 11 cools during the time that the motor circuit is opened by the device 12 and, consequently, the device 11 is not given the full heating effect of the stalled current. Since the heating effect varies with the square of the currents and since the device 12 allows the circuit to be closed under stalled conditions only about 16 per cent of the time, it will be observed that the equivalent continuous current heating the device 11 is about 40% of the stalled current of 12½ amperes. In other words, 40% of the stalled current flowing continuously would heat the device 11 sufficiently to cause it to open the motor circuit in approximately 500 seconds.

However, such a continuous current of about 40% of the stalled rotor current, i. e. 5 amperes, would not cause operation of the device 12 because the device 12 has a current rating of 8 amperes, which means that any current less than 8 amperes will not operate it. The device 11 is effective to give adequate overload protection for the motor on overload currents between its continuous current rating of 4.2 amperes and any current the motor may draw. The device 12, while having a much higher ampere rating than the device 11, is more quickly responsive to currents above its rated current. With currents greater than approximately 11 amperes, the device 12 operated first and thereby prevented operation of the device 11 in direct response to such currents. As previously stated, with currents of stalled rotor magnitude, i. e. 12½ amperes, the device 12 operated four times before the device 11 operated.

It will be understood that the device 11 is located to operate under the same ambient temperature conditions as the motor 10 ordinarily in the same room with the motor. In other words, the time required for the device 11 to operate for any particular motor overload current is substantially the same but somewhat shorter than the time required at that current for the motor to heat to its maximum permissible temperature. This assures operation of the device 11 in response to overloads before the motor has been heated to a temperature high enough to damage it. Under the stalled rotor conditions described, when the device 12 comes into operation the motor cools while it is deenergized and the device 11 likewise cools proportionately to the same temperature so that under these conditions also the device 11 duplicates the temperature conditions of the motor at least to the extent that it operates before the motor is overheated. Of course, it will be understood that the temperatures of the device 11 and the motor may not be the same. Presumably the temperature to which the solder 16 must be heated to melt it is higher than the maximum permissible temperature of the motor.

The number of times that the device 12 operates to open and close the motor circuit under stalled conditions may be selected as desired by the selection of a device 12 having a suitable current rating. Thus a device 12 having a continuous current rating lower than 8 amperes is heated more quickly and therefore opens and closes the motor circuit a greater number of times before the device 11 operates. I contemplate that the device 11 will in all cases have the temperature characteristics previously described to give adequate protection to the motor on all overload currents. It will be understood that the devices 11 and 12 may have constructions different from those shown, their essential characteristics being that the device 11 permanently opens the circuit while the device 12 repeatedly opens and closes it. Thus the device 11 may be provided with a bimetallic thermal responsive element.

It will be understood that, if desired, a single switch only, i. e., a single pair of cooperating switch contacts, may be used in the circuit of the motor, this single switch being actuated by the two devices 11 and 12. For example, both contacts of the single switch may be movable and one actuated by the device 11, while the other is actuated by the device 12. Under normal current conditions, of course, the two contacts would be in engagement with each other and thus maintain the motor circuit closed.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. The combination of a motor adapted to have its rotor stalled over an appreciable interval of time without damage to the motor, of a first switch biased to an open circuit position in circuit with said motor, manually operated means for closing said switch, means for holding said switch closed, a first thermal current responsive means for effecting the opening of said switch having a continuous current rating substantially the same as said motor and heating characteristics substantially the same as the motor connected in circuit with said motor so as to be heated by the current in said motor to an operating temperature and open said first switch to deenergize said motor and thereby protect said motor against damage from overheating under all overload conditions including stalled rotor conditions, a second switch in the circuit of said motor, a second thermal current responsive means for opening said second switch when heated to a predetermined temperature and thereafter closing said second switch after cooling to a predetermined temperature, and electric connections connecting said second thermal current responsive means in the circuit of said motor so that said second thermal current responsive means is responsive to the current in said motor to open said second switch, said second thermal current responsive means having a continuous current rating substantially greater than the continuous current rating of said motor so as to be ineffective to open said second switch in response to currents in said motor of normal overload magnitudes but constructed and arranged to be heated by stalled rotor currents in said motor more quickly to its operating temperature than said first thermal current responsive means so that under stalled rotor conditions said second thermal current responsive means opens the circuit of said motor before said first thermal current responsive means is heated to its operating temperature and thereafter closes the circuit of said motor whereby said second thermal current responsive means opens and closes the circuit of said motor a plurality of times before said first thermal responsive means is heated to its operating temperature and operates to open the circuit of said motor to protect the motor against damage from overheating.

2. The combination with a motor of switching means in circuit with the motor operable to open or close the motor circuit, current responsive means connected in the circuit of the motor and operatively connected to said switching means thereby to effect the operation of said switching means permanently to open the circuit of the motor after a time interval upon the occurrence of all overcurrent conditions, and a second current responsive means connected in the circuit of the motor and operatively connected to said switching means, said second current responsive means being constructed to operate under predetermined high current conditions before said first current responsive means to effect the operation of said switching means to open and close the circuit of the motor a plurality of times during the time required by said first current responsive means to operate said switching means permanently to deenergized said motor.

3. The combination with a motor of normally closed switching means in circuit with the motor operable to open or close the motor circuit, thermal current responsive means connected to be heated by the current in the circuit of the motor and operatively connected to said switching means so as to operate said switching means permanently to open the circuit of the motor after a time interval upon the occurrence of all overcurrent conditions, and a second thermal current responsive means connected to be heated by the current in the circuit of the motor and operatively connected to said switching means, said second thermal current responsive means being responsive to the current in said circuit under predetermined high current conditions, to operate said switching means to open and close the circuit of the motor a plurality of times during the time required by said first thermal means to operate said switching means permanently to deenergize said motor.

4. The combination with a motor of normally closed switch means in circuit with said motor, thermal current responsive means connected to be heated by the current in the circuit of the motor for opening said switch means in response to a predetermined high current in said motor thereby permanently to deenergize said motor, and a second thermal current responsive means connected to be heated by the current in the circuit of the motor for opening said switch means to deenergize said motor after a time interval in response to said predetermined current in said motor before said first thermal current responsive means operates said switch means in response to said predetermined current and for reclosing said switch means to reenergize the motor after an interval of time, said second thermal means thereby operating said switch means to open and close the motor circuit a plurality of times during the time required by said first thermal means to operate said switch means to open permanently the circuit of said motor.

5. The combination with a motor adapted to have its rotor stalled over an appreciable interval of time without damage to the motor, of a first normally closed switch in circuit with said motor, current responsive means connected in the circuit of the motor for opening said first switch in response to the current in said motor when its rotor is stalled after a time interval thereby permanently to deenergize said motor, a second normally closed switch in the circuit of said motor, and a second current responsive means connected in the circuit of said motor for opening said second switch to deenergize said motor after a time interval in response to a stalled rotor current in said motor before said first current responsive means opens said first switch and for reclosing said second switch to reenergize the motor after an interval of time, said second current responsive means thereby operating under stalled rotor conditions to open and close the motor circuit a plurality of times during the time required by said first current responsive means to operate its switch to open permanently the circuit of said motor.

6. The combination with a motor of a first normally closed switch in circuit with said motor, a thermal current responsive means connected to be heated by the current in the circuit of the motor for opening permanently said first switch after a time interval to prevent overheating and damage to the motor under all overload current conditions in said motor, a second normally closed switch in the circuit of said motor, and a second thermal current responsive means connected to be heated by the current in the circuit of the motor to open said second switch and deenergize the motor only under predetermined high current conditions in the circuit of the motor and before said first thermal means opens said first switch, said second thermal means being arranged to reclose said second switch to reenergize the motor after an interval of time thereby to open and close the motor circuit a plurality of times until said first thermal means is heated to a temperature high enough to operate and permanently deenergize the motor.

7. The combination with a motor, of a first normally closed switch in circuit with the motor, thermal current responsive means having a continuous current rating substantially the same as said motor connected in the circuit of said motor so as to be heated by the current in said motor thereby to open permanently said first switch and deenergize said motor to protect said motor under all overload motor current conditions, a second normally closed switch in the circuit of said motor, and a second thermal current responsive means connected in the circuit of said motor so as to be heated by the current in said motor to open and close said second switch thereby to deenergize and energize said motor, said second thermal means having a continuous current rating of substantially twice the continuous current rating of said motor so that said second thermal means is unresponsive to normal overload currents in said motor but constructed and arranged to be heated sufficiently to open said second switch upon the occurrence of a predetermined high current in the circuit of said motor before said first thermal means opens said first switch.

8. Electric protective apparatus comprising a first switch, means for closing said switch, a first current responsive means for effecting the opening of said first switch connected in series circuit with said first switch and constructed to be operated by currents higher than a predetermined value to open said first switch, a second switch connected in series circuit with said first switch, a second current responsive means connected in series circuit with said switches constructed to open said second switch and thereafter close said second switch after a time interval, said second current responsive means being constructed to be ineffective to open said second switch in response to currents substantially higher than said predetermined value but responsive to still higher currents to operate before said first means so as to open and close said second switch a plurality of times before said first current responsive means opens said first switch.

9. Electric protective apparatus comprising a first switch, means for closing said switch, a first thermal current responsive means for effecting the opening of said first switch connected in series circuit with said first switch and constructed to be heated by currents higher than a predetermined value to an operating temperature to open said first switch, a second switch connected in series circuit with said first switch, a second thermal current responsive means connected in series circuit with said switches for opening said second switch when heated to an operating temperature and thereafter close said second switch when cooled to a predetermined temperature, said second thermal means being constructed to be ineffective to open said second switch in response to currents substantially higher than said predetermined value but heated by still higher currents to its operating temperature before said first thermal means so as to open and close said second switch a plurality of times before said first thermal means opens said first switch.

10. Apparatus for protecting an electric motor against overcurrents while providing for repeated energization of the motor under predetermined high current conditions comprising a first switch biased to an open circuit position, manually operated means for closing said switch, means for holding said switch closed, a first thermal current responsive means for releasing said holding means to effect the opening of said first switch connected in series circuit with said first switch and constructed to be heated by a current higher than a predetermined value to an operating temperature to open said first switch, a second switch connected in series circuit with said first switch, a second thermal current responsive means connected in series circuit with said switches for opening said second switch when heated to an operating temperature and thereafter closing said second switch when cooled to a predetermined temperature, said second thermal means being constructed to have a continuous current rating substantially higher than said predetermined current so as to be ineffective to open said second switch in response to currents substantially higher than said predetermined value but heated by still higher currents to its operating temperature before said first thermal means so as to open and close said second switch a plurality of times before said first thermal means opens said first switch.

EDGAR H. AYERS.